United States Patent [19]

Yamagata et al.

[11] Patent Number: 5,226,259
[45] Date of Patent: Jul. 13, 1993

[54] AUTOMOTIVE DOOR WITH POWER WINDOW

[75] Inventors: Shuji Yamagata, Kanagawa; Kensuke Uchida, Tokyo; Masaki Kondo; Yuichi Kato, both of Kanagawa, all of Japan

[73] Assignees: Nissan Motor Co., Ltd.; Ohi Seisakusho Co., Ltd., both of Yokohama, Japan

[21] Appl. No.: 794,253

[22] Filed: Nov. 19, 1991

[30] Foreign Application Priority Data

Nov. 29, 1990 [JP] Japan .................................. 2-331885
Nov. 29, 1990 [JP] Japan .................................. 2-331886

[51] Int. Cl.$^5$ ............................................. B60J 5/04
[52] U.S. Cl. ........................................ 49/502; 49/352
[58] Field of Search ............... 49/502, 352; 296/146 J, 296/146 B

[56] References Cited

U.S. PATENT DOCUMENTS

| | | | |
|---|---|---|---|
| 4,416,088 | 11/1983 | Feucht et al. | 49/502 |
| 4,651,470 | 3/1987 | Imura et al. | 49/502 |
| 4,843,762 | 7/1989 | Grier et al. | 49/502 X |
| 4,934,099 | 6/1990 | Maekawa et al. | 49/352 |
| 4,974,365 | 12/1990 | Ono | 49/502 |
| 5,040,334 | 8/1991 | Dossin et al. | 49/502 |
| 5,062,240 | 11/1991 | Brusasco | 49/502 X |

FOREIGN PATENT DOCUMENTS 0170150 2/1986 European Pat. Off. .

Primary Examiner—Philip C. Kannan
Attorney, Agent, or Firm—Foley & Lardner

[57] ABSTRACT

An automotive door equipped with a window regulator is described. The door comprises an outer panel module, a pane lift module, a door lock module, a frame module to which the pane lift module and the door lock module are secured to constitute an interior unit, and an inner panel module. The inner panel module and the outer panel module are secured at their peripheral portions in a manner to sandwich therebetween the interior unit.

27 Claims, 16 Drawing Sheets

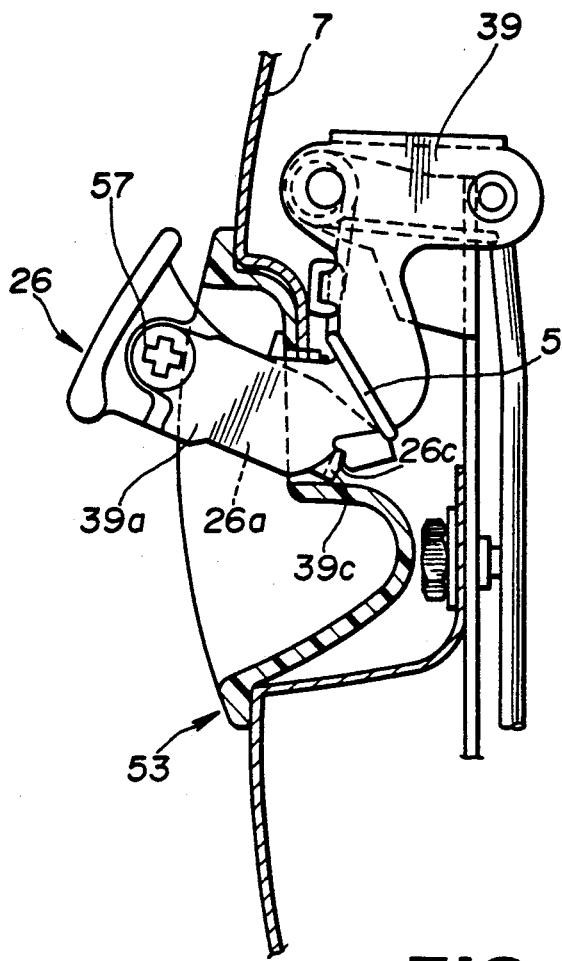
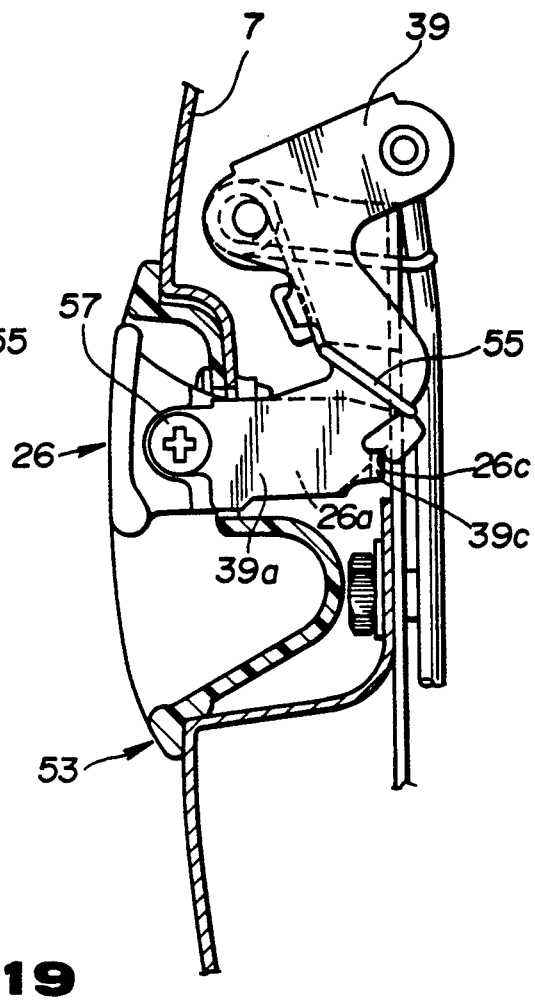
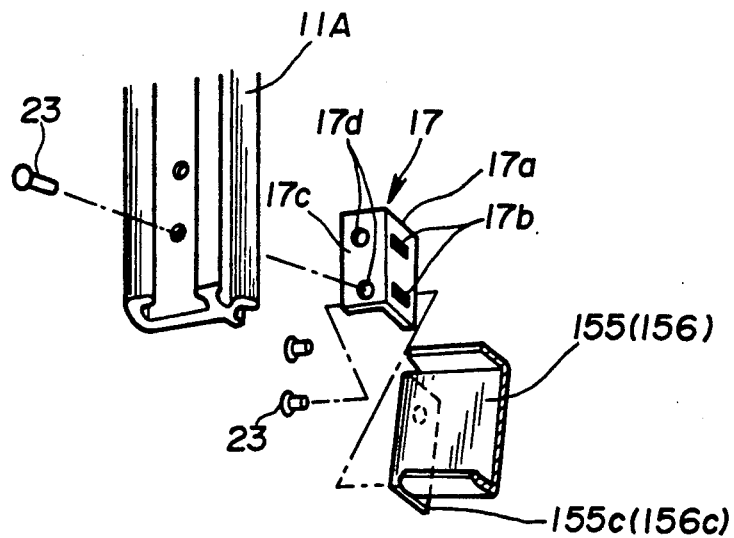

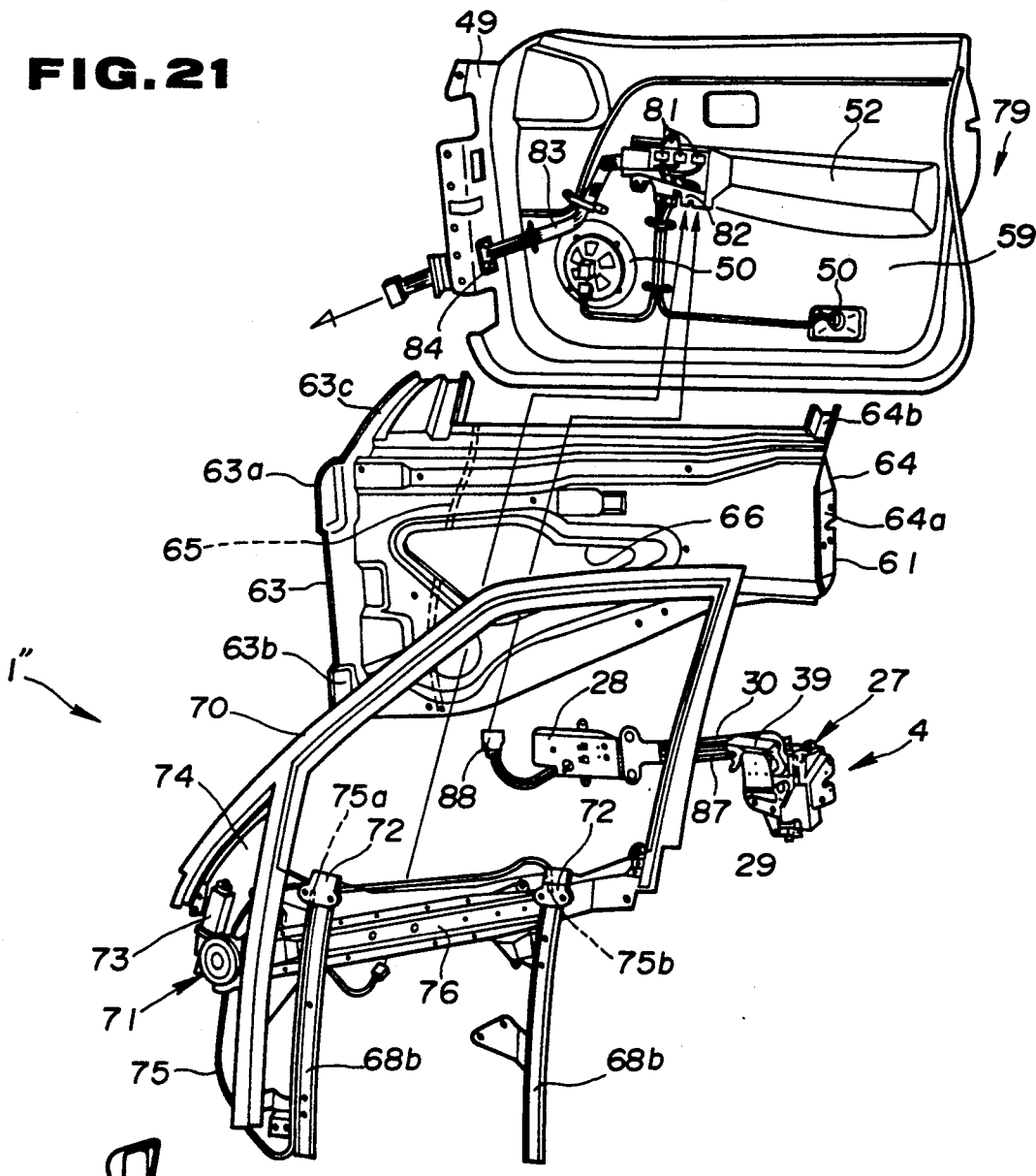
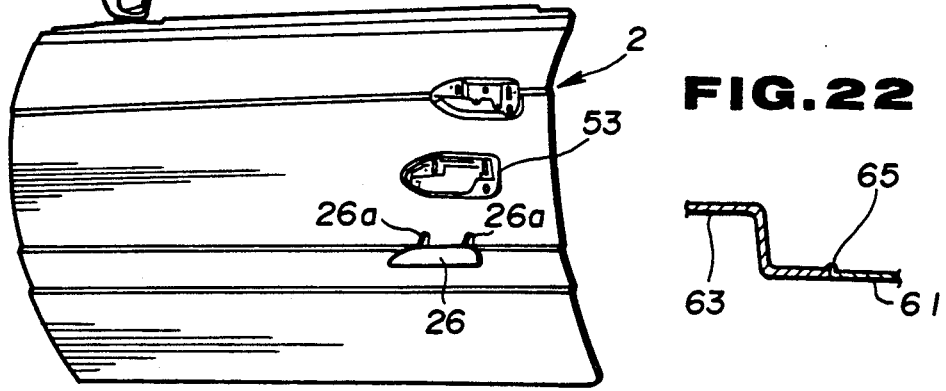

AUTOMOTIVE DOOR WITH POWER WINDOW

BACKGROUND OF THE INVENTION

1. Field of the Invention

The present invention relates in general to doors for a motor vehicle, and more particularly, to automotive doors of a type which is equipped with a power window.

2. Description of the Prior Art

Hitherto, various automotive doors of the above-mentioned type have been proposed and put into practical use. However, due to their inherent constructions, some of them have failed to make a satisfied operation of the power window mounted therein. In fact, after long use, some of them tend to have such a problem that the upward and downward movement of the window pane can not be made smoothly due to unavoidable deformation of the door. The deformation of the door tends to cause a play of the window pane particularly at the time when the window pane is halfly or incompletely opened. Such play produces a noise during cruising of the vehicle. Furthermore, some of the automotive doors have failed to have a sufficient space for accommodating the power window. In this case, the work for mounting the power window to the door is difficult.

Furthermore, hitherto, inspection of the power window has been carried out after the same is properly mounted to the door. However, such inspection is troublesome. In fact, when a defect is found in the power window, it becomes necessary to dismantle the same from the door for repairing the same. Thereafter, the power window should be mounted to the door again. This is very troublesome and time consuming.

SUMMARY OF THE INVENTION

It is therefore an object of the present invention to provide an automotive door having a power window installed therein, which door is free of the above-mentioned drawbacks.

According to the present invention, there is provided an automotive door which comprises an outer panel module including an outer panel; a pane lift module including a sash, a window pane vertically slidably held by the sash, two spaced guide means connected to the sash, each guide means extending vertically, two carrier plates respectively guided by the guide means and carrying thereon the window pane, and an electric drive means for driving the carrier plates along the guide means; a door lock module including a door lock; a frame module to which the pane lift module and the door lock module are secured to constitute an interior unit; and an inner panel module including an inner panel, the inner panel module being secured to the outer panel module having the interior unit disposed therebetween.

BRIEF DESCRIPTION OF THE DRAWINGS

Other objects and advantages of the present invention will become apparent from the following description when taken in conjunction with the accompanying drawings, in which:

FIGS. 1 to 17 are drawings showing an automotive right side door which is a first embodiment of the present invention, in which:

FIG. 1 is an exploded view of a door of the first embodiment;

FIG. 2 is a sectional view of a part of the door in an assembled condition;

FIG. 3 is a sectional view taken along a horizontal line below a waist portion of the assembled door;

FIG. 4 is a sectional view taken along a horizontal line above the waist portion of the assembled door;

FIG. 5 is a vertically sectional view of a portion of the assembled door, showing a window pane held by a window pane holder;

FIG. 6 is a perspective view of a door lock module, which view is taken from one direction;

FIG. 7 is a perspective view of the door lock module, which view is taken from the opposite direction;

FIG. 8 is an exploded view of a portion of the door where an inside handle mounting bracket and a connecting bracket are connected;

FIG. 9 is an exploded view of a portion of the door where a door lock mounting bracket and the connecting bracket are connected;

FIG. 10 is a perspective view of the door with an outer panel dismantled;

FIG. 11 is a perspective view of the door with an escutcheon dismantled;

FIG. 12 is a sectional view of the escutcheon; and

FIGS. 13 to 17 are sectional views of a part of the door, showing the steps for mounting an outside handle to a handle lever;

FIGS. 18 to 20 are drawings showing an automotive right side door, which is a second embodiment of the present invention, in which:

FIG. 18 is an exploded view of the door of the second embodiment;

FIG. 19 is an exploded view of a portion of the door where a window pane guide and a position adjusting bracket are connected; and FIG. 20 is a perspective view of the door in a bared condition, showing a pane lift module; and FIGS. 21 to 24 are drawings showing an automotive left side door, which is a third embodiment of the present invention, in which:

FIG. 21 is an exploded view of the door of the third embodiment;

FIG. 22 is a sectional view of a part of a frame module;

FIG. 23 is a sectional view of a portion wherein a sash and a bracket are connected; and FIG. 24 is a perspective view of the door having the frame module, pane lift module and the door lock module assembled thereto.

DETAILED DESCRIPTION OF THE EMBODIMENTS

Figure 1:
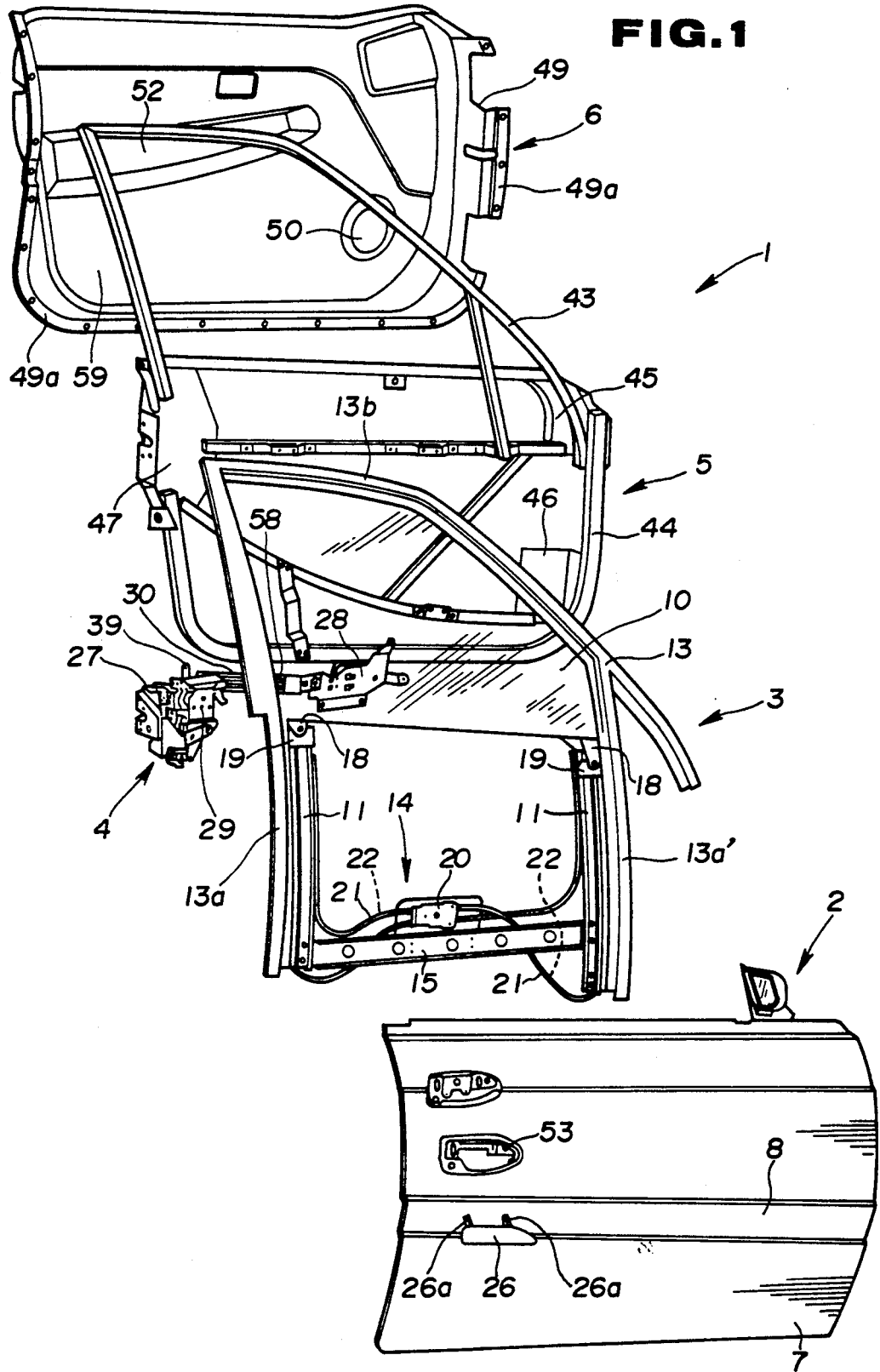

Referring to FIGS. 1 to 17, particularly FIG. 1, there is shown an automotive right side door of a first embodiment of the present invention, which is generally designated by numeral 1.

As is shown in FIG. 1, the door 1 comprises generally an outer panel module 2, a pane lift module 3, a door lock module 4, a frame module 5 and an inner panel module 6.

Figure 2:
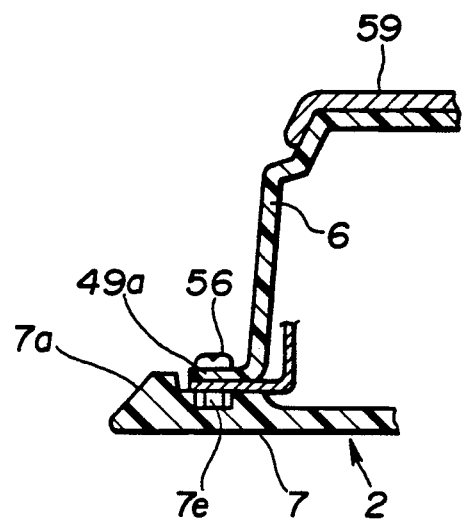
Figure 3:
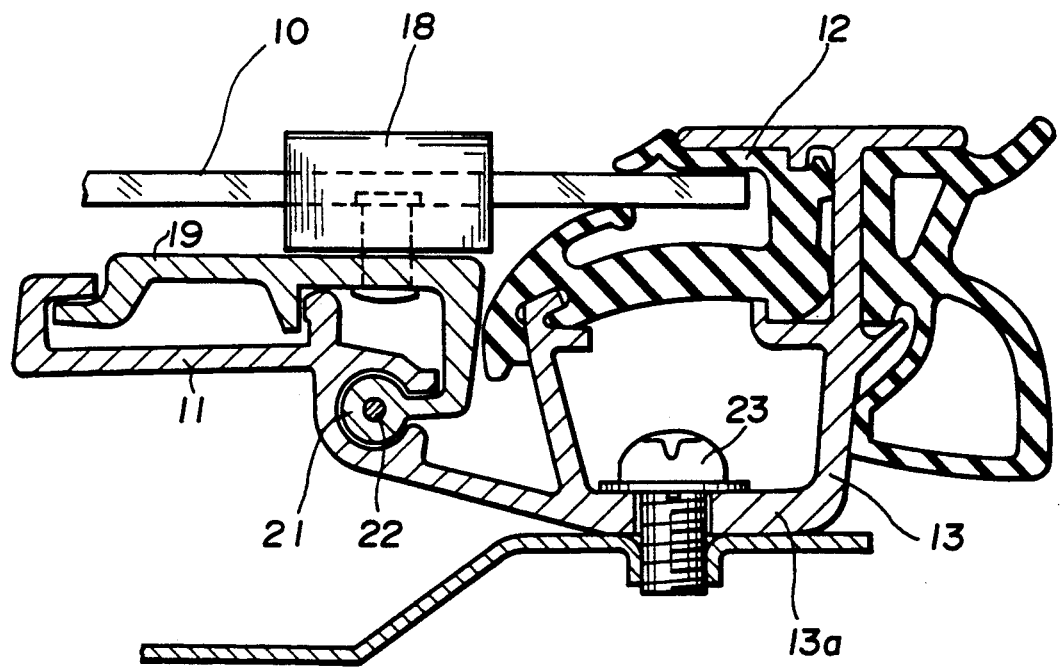
Figure 4:
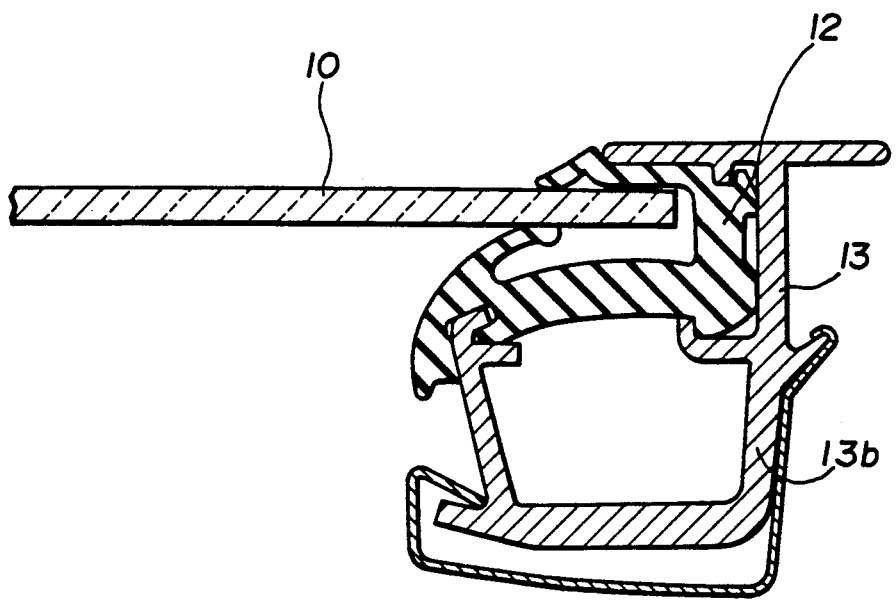
Figure 5:
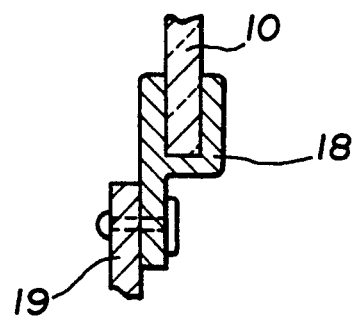

The outer panel module 2 comprises a plastic outer panel 7. As is shown in FIG. 2, the outer panel 7 has around its periphery a thicker hem portion 7a to which the inner panel module 6 is secured in an after-mentioned manner. For the securing of the inner panel module 6 thereto, the thicker hem portion 7a has a plurality of nuts 7e embedded therein. As is shown in FIG. 1, a molded strap 8 is mounted to a waist portion of the outer panel 7.

As is seen from FIGS. 1, 3 to 5, the pane lift module 3 comprises two parallel guides 11 by which a window pane 10 is guided, a sash 13 equipped with a pane runner 12 (see FIGS. 3 and 4), and a pane regulator 14 for regulating the window pane 10. The pane lift module 3 is secured to the frame module 5.

That is, the sash 13 comprises two spaced vertical portions 13a and 13a' and an upper bridge portion 13b which is integrally connected to upper ends of the vertical portions 13a and 13a'.

It is to be noted that the vertical portions 13a and 13a' of the sash 13 are integrally formed at their insides with the pane guides 11. Each guide 11 extends downward to a waist part of the door 1.

Lower portions of the guides 11 are secured to a horizontal beam 15. Thus, the sash 13 and the horizontal beam 15 constitute an enclosed frame structure.

As is seen from FIG. 1, two holders 18 are secured to spaced lower ends of the window pane 10, and respective carrier plates 19 are pivotally connected to the holders 18. As is best seen from FIG. 3, each carrier plate 19 is slidably guided by the corresponding guide 11 when moved upward and downward.

To the horizontal beam 15, there is secured a reversible electric motor 20 from which two pairs of flexible tubes 21 extend to the respective guides 11. Within each pair of tubes 21, there is slidably disposed a flexible geared cable 22. Both ends of each geared cable 22 are connected to corresponding one carrier plate 19. Thus, upon energization of the motor 20, the geared cables 22 are moved in one direction thereby to move the carrier plates 19 and thus the window pane 10 upward or downward along the guides 11.

As is best shown in FIGS. 6 to 9, the door lock module 4 comprises generally an inside handle 25, a door lock 27 and a connecting bracket 30.

Figure 6:
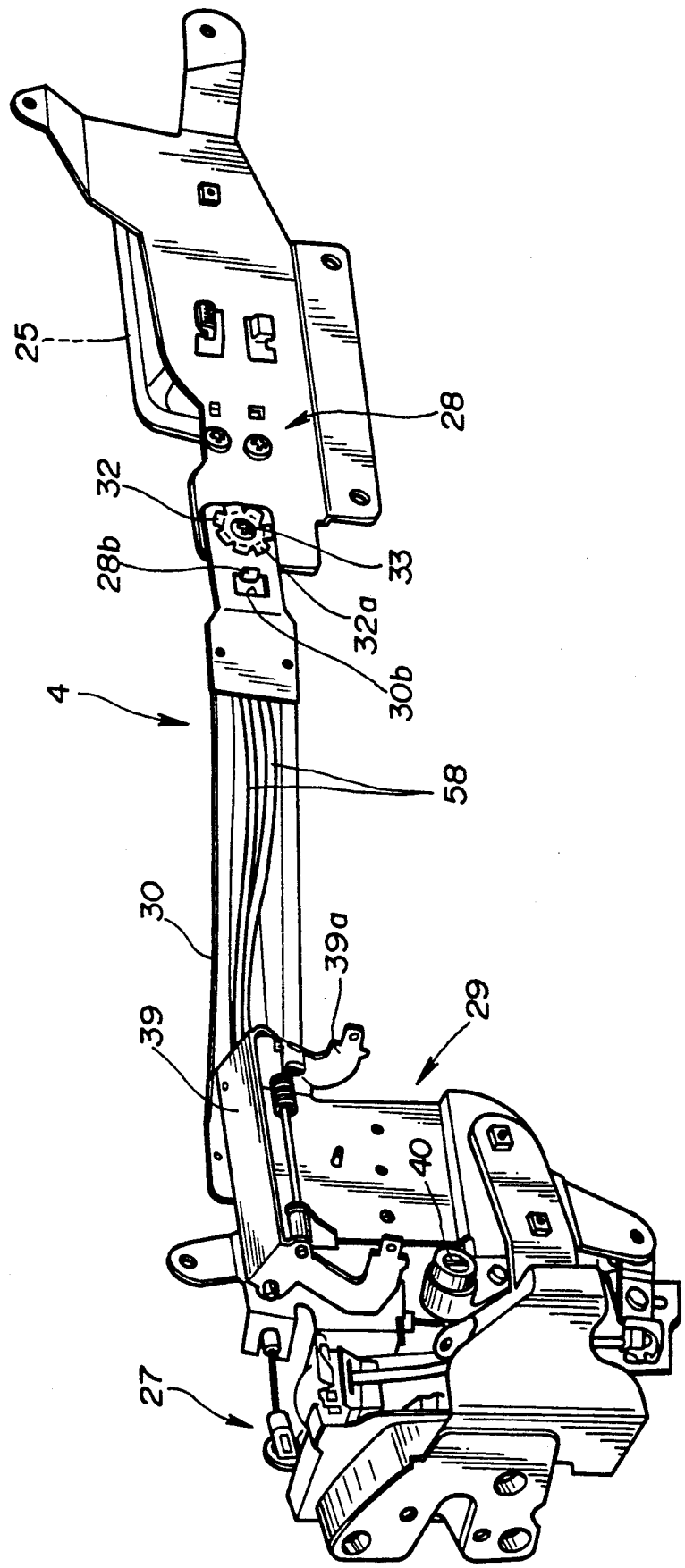
Figure 7:
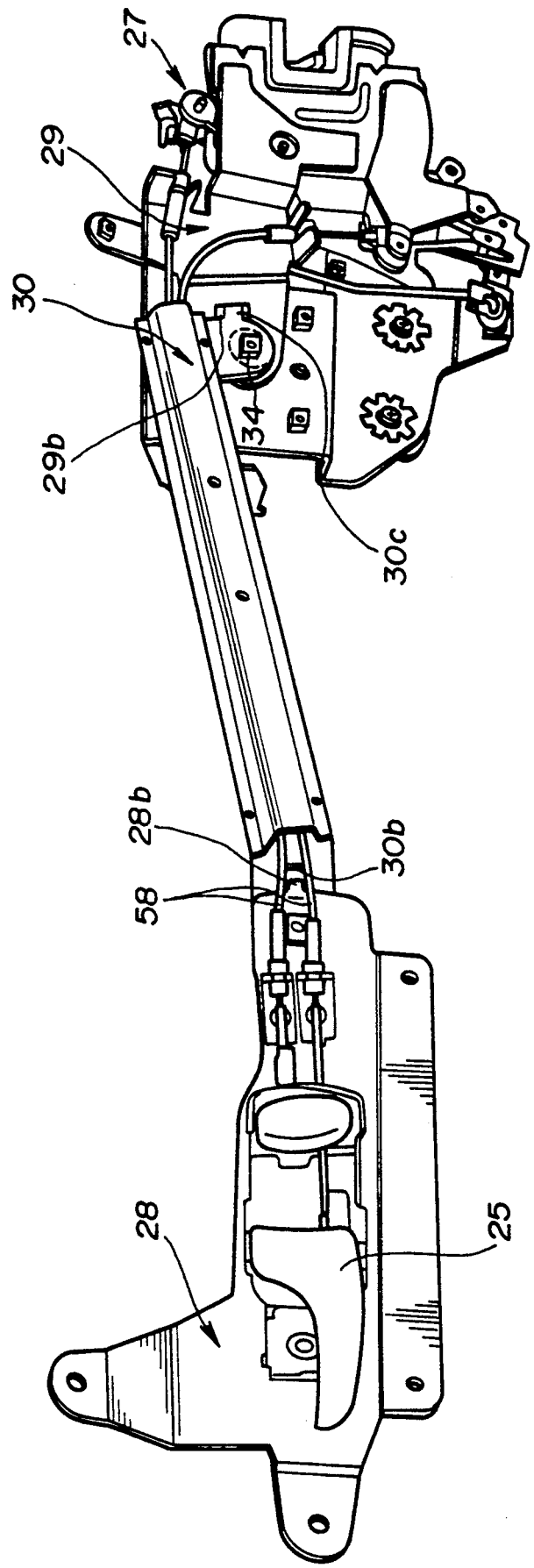

That is, as is seen from FIG. 7, the inside handle 25 is mounted to an inside handle mounting bracket 28 and, as is seen from from FIG. 6, the door lock 27 is mounted to a door lock mounting bracket 29. These two mounting brackets 28 and 29 are connected to longitudinal ends of the connecting bracket 30 through respective position adjusting means.

Figure 8:
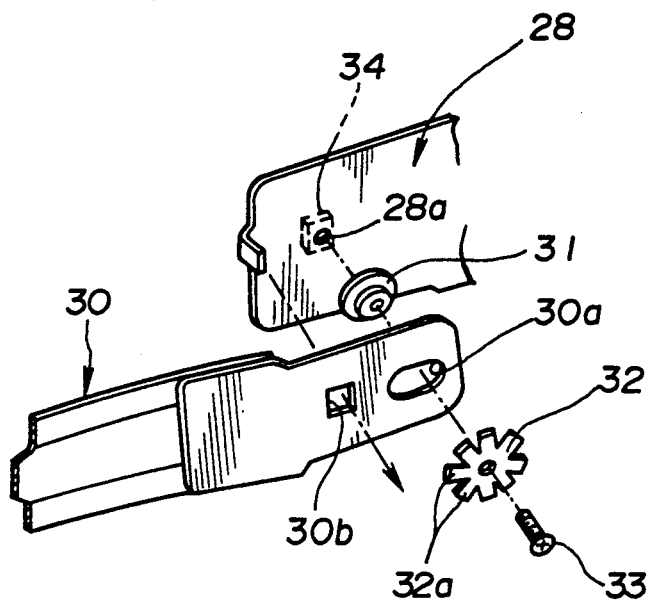

FIG. 8 shows the position adjusting means between the inside handle mounting bracket 28 and the connecting bracket 30. That is, the inside handle mounting bracket 28 is formed with an opening 28a and a stopper pawl 28b. The opening 28a is mated with a nut 34 welded to the bracket 28. The connecting bracket 30 is formed with an elongate slot 30a and a rectangular opening 30b. The stopper pawl 28b is put into the rectangular opening 30b, and a bolt 33 is passed through a plastic washer 32, the slot 30a, an annular bush 31 and the opening 28a and tightly fastened to the nut 34. The plastic washer 32 is formed with a plurality of radially extending fins 32a. It is to be noted that for permitting a relative positioning between these two brackets 28 and 30, the elongate slot 30a and the rectangular opening 30b are sized somewhat larger as compared with the bolt 33 and the stopper pawl 28b.

Figure 9:
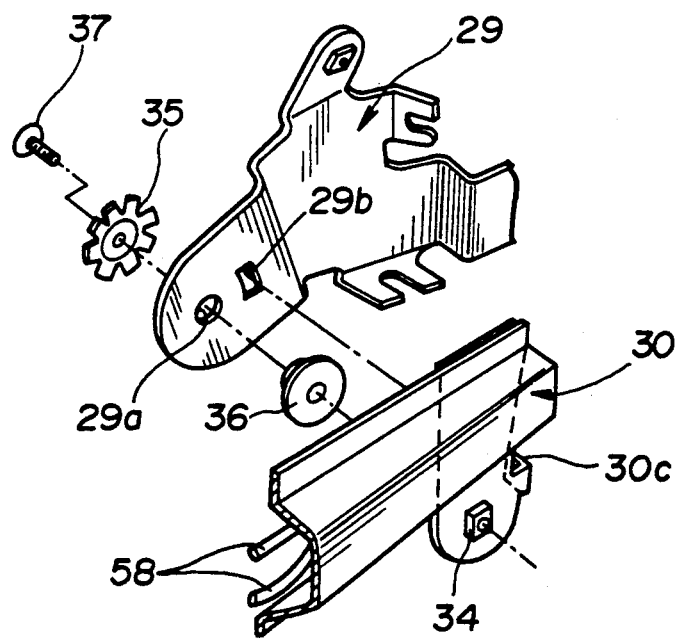

FIG. 9 shows the position adjusting means between the door lock mounting bracket 29 and connecting bracket 30. The door lock mounting bracket 29 is formed with an opening 29a and an arcuate slot 29b which is concentric with the opening 29a. The connecting bracket 30 is formed with an opening (no numeral) and a stopper pawl 30c. The opening is mated with a nut 34 welded to the bracket 30. The stopper pawl 30c is put into the arcuate slot 29b, and a bolt 37 is passed through a plastic washer 35, the opening 29a, an annular bush 36 and the opening of the bracket 30 and tightly fastened to the nut 34. It is to be noted that for permitting a relative positioning between these two brackets 29 and 30, the opening 29a and the arcuate slot 29b are sized somewhat larger as compared with the bolt 37 and the stopper pawl 30c.

Figure 10:
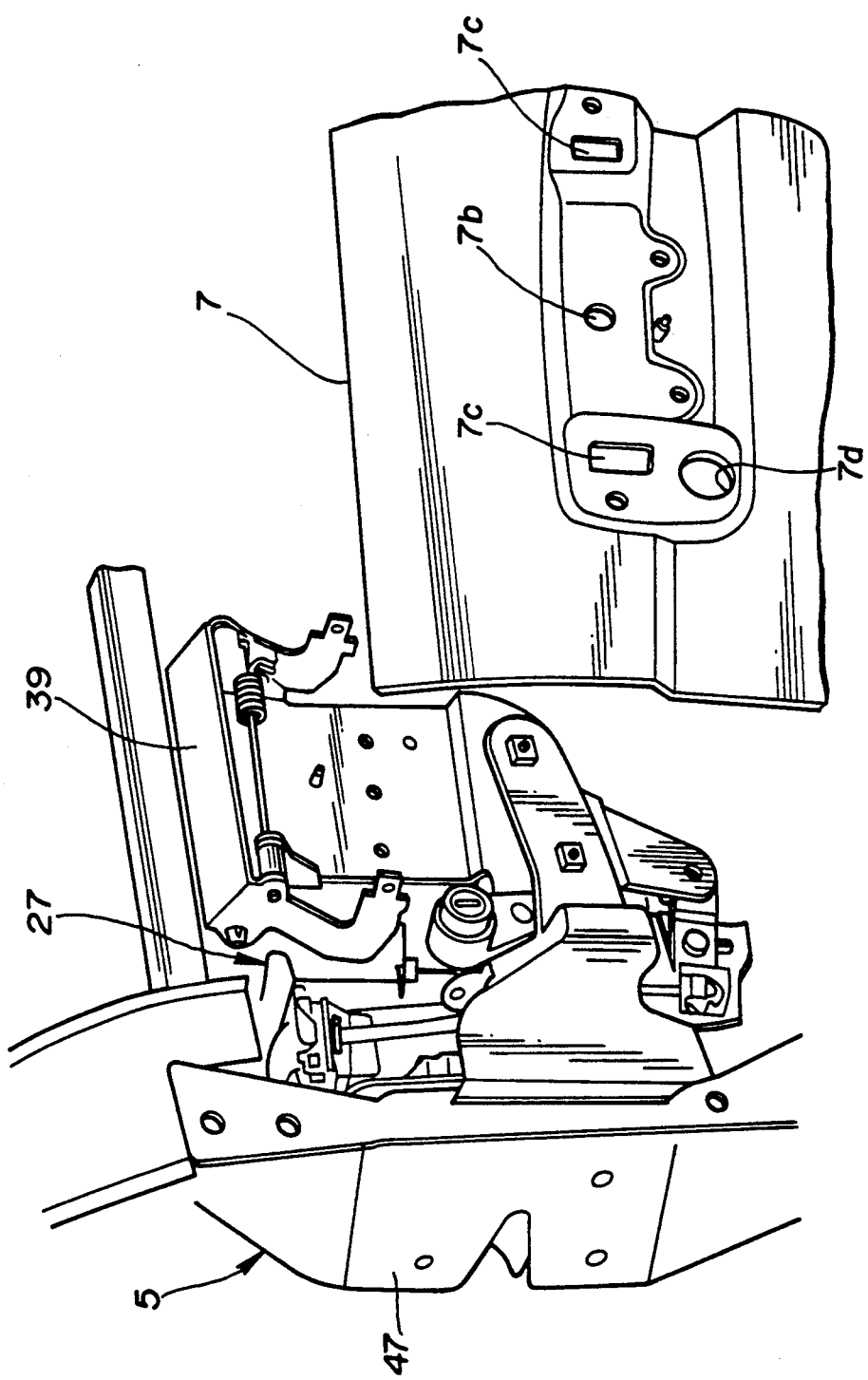
Figure 11:
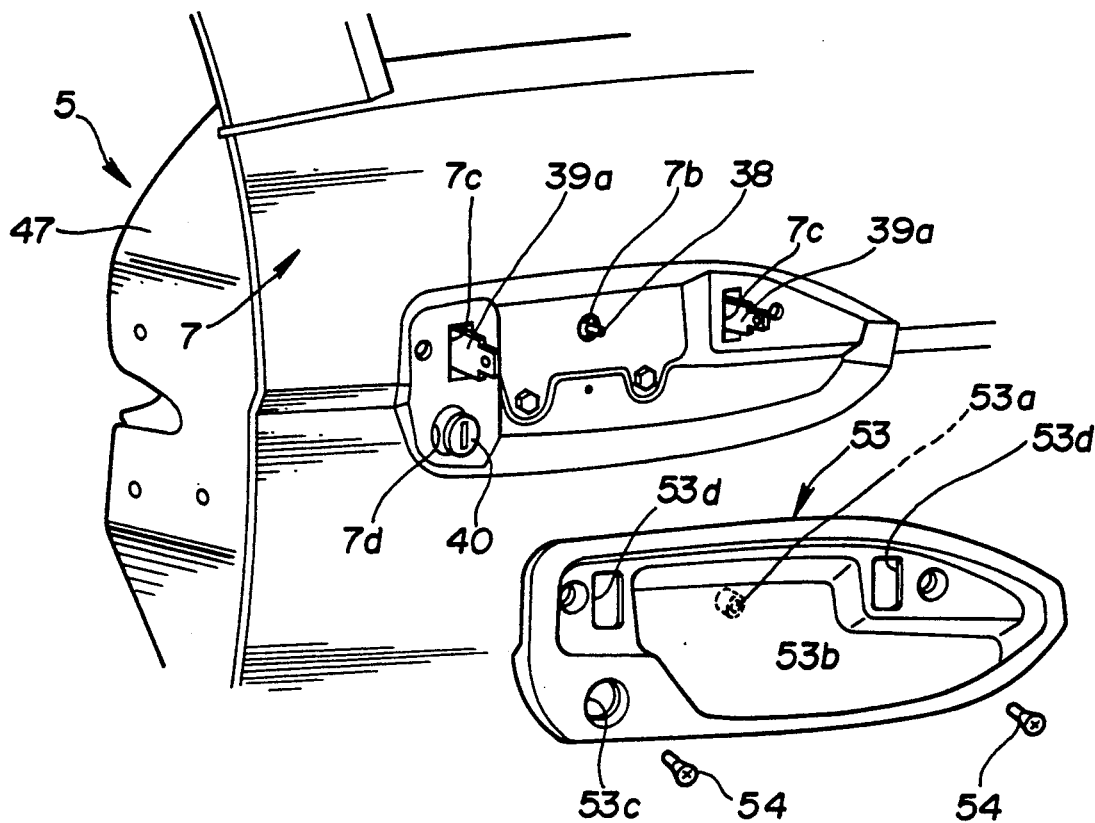

As is seen from FIGS. 10 and 11, the door lock mounting bracket 29 has a guide pin 38 secured thereto. A handle lever 39 is pivotally mounted to the bracket 29. The handle lever 39 has two bent arm portions 39a. Designated by numeral 40 is a key cylinder which is connected to the door lock 27 through a known link mechanism. The outer panel 7 is formed at its depressed portion with openings 7b, 7c and 7d through which the guide pin 38, the arm portions 39a and the key cylinder 40 are exposed to the outside when the outer panel 7 assumes a proper position relative to the door lock mounting bracket 29, as will be seen from FIG. 11. An escutcheon 53 is mounted to the depressed portion of the outer panel 7 to cover the same.

Figure 12:
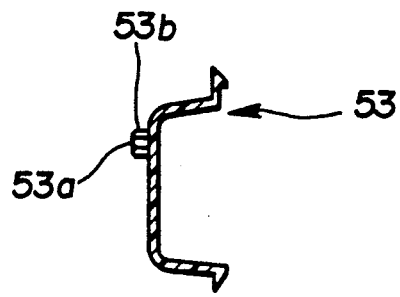

As is seen from FIGS. 11 and 12, the escutcheon 53 has openings 53d and 53c which correspond to the openings 7c and 7d of the outer panel 7. The escutcheon 53 further has at its back surface a small projection 53b which has a bore 53a. When the escutcheon 53 is properly mounted to the outer panel 7, the guide pin 38 is received in the bore 53a of the projection 53b, and the arm portions 39a and the key cylinder 40 are exposed to the outside through the openings 53d and 53c. It is to be noted that the engagement of the guide pin 38 to the projection 53b assures the positoning of the escutcheon 53 relative to the outer panel 7. Two bolts 54 are used for securing the escutcheon 53 to the outer panel 7.

An outside handle 26 (see FIG. 1) is connected to the exposed arm portions 39a of the handle lever 39.

Figure 13:
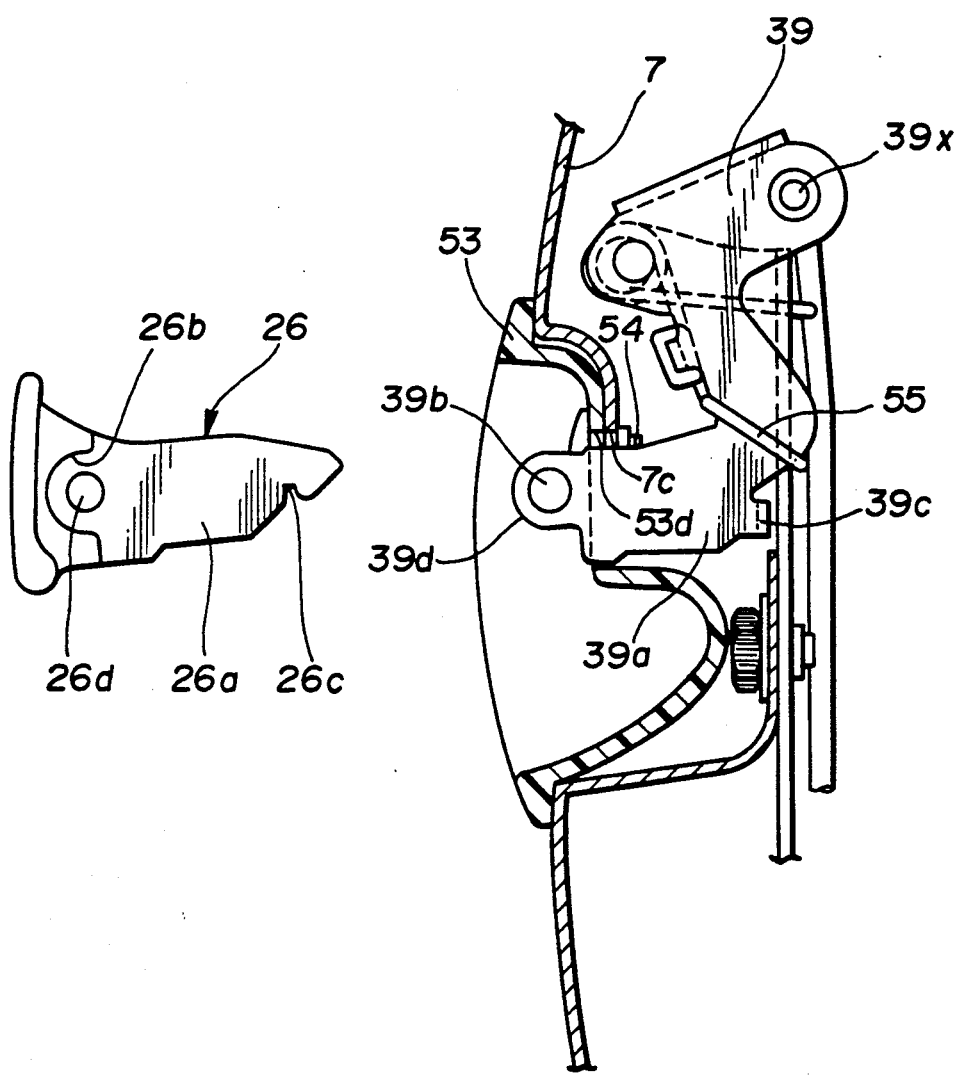

As is seen from FIG. 13, due to the force of a spring 55, the handle lever 39 is biased to turn about its pivot axis 39x in a counterclockwise direction in the drawing. Each arm portion 39a of the handle lever 39 is formed at its leading end 39d with an opening 39b and at its middle back portion with a bent lug 39c. The leading end 39d is shaped semicircular.

As is understood from FIG. 1, the outside handle 26 has two spaced arm portions 26a. As is seen from FIG. 13, each arm portion 26a has at its root a semicircular depressed portion 26b and at its leading portion a recess 26c. The depressed portion 26b is formed with an opening 26d.

As will become apparent from the following, when the outside handle 26 is properly mounted to the handle lever 39, the semicircular leading end 39d of the handle lever arm portion 39a is received in the depressed portion 26b of the outside handle arm portion 26a, and the bent lug 39c of the handle lever arm portion 39a is engaged with the recess 26c of the outside handle arm portion 26a.

Figures 14, 15:
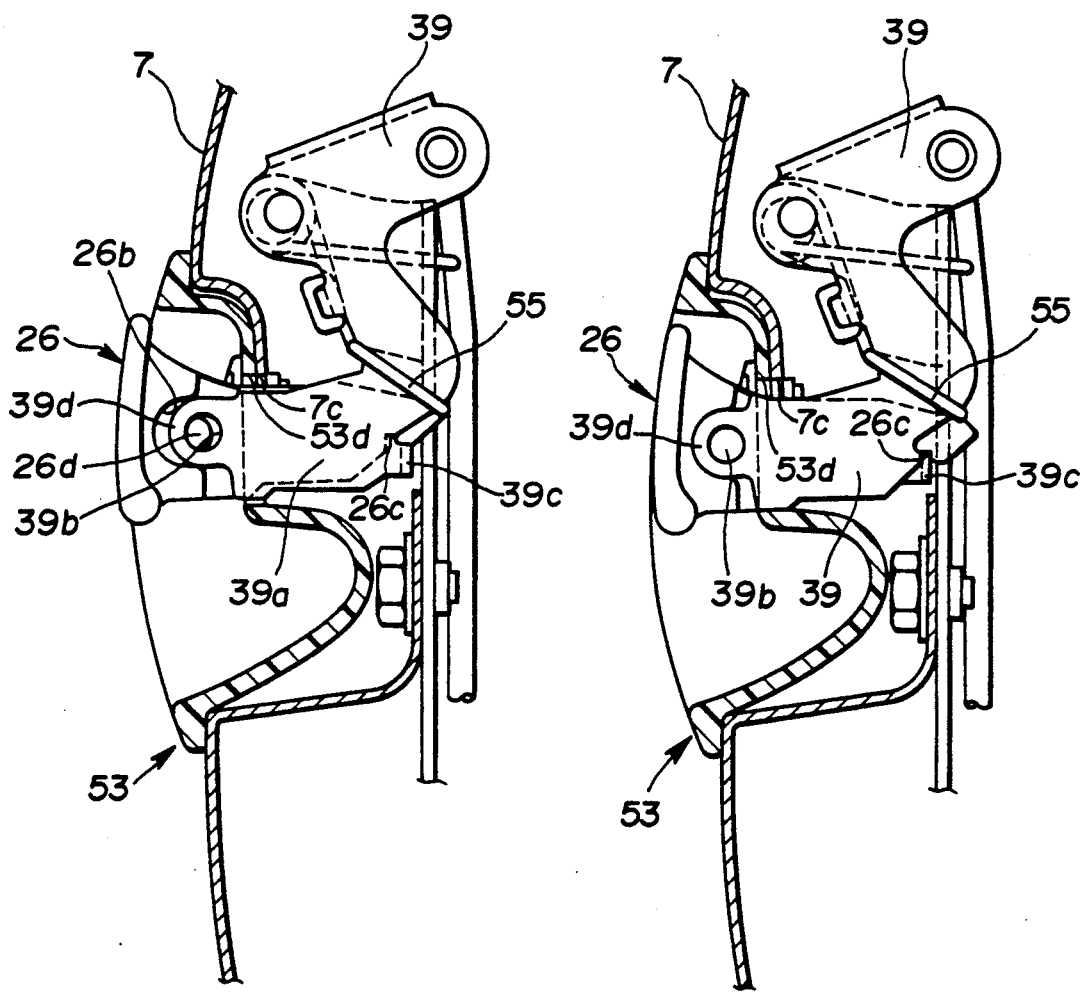

That is, as will be seen from FIGS. 11, 13, 14 and 15, the arm portions 26a of the outside handle 26 are inserted into the outer panel 7 through the openings 53d of the escutcheon 53 and the openings 7c of the outer panel 7. With this insertion, the recess 26c of each handle arm portion 26a of the outside handle 26 is engaged with the bent lug 39c of the handle lever 39, the leading end of each arm portion 26a is sandwiched between the bent lug 39c and the spring 55 and the depressed portion 26b of each arm portion 26a receives the leading end 39d of each arm portion 39a of the handle lever 39, as is illustrated in FIG. 15. In this condition, the opening 39b of each handle lever arm portion 39a and the opening 26d of the corresponding outside handle arm portion 26a are mated.

Then, as is seen from FIG. 16, the outside handle 26 is pivoted upward against the force of the spring 55 causing the outside handle 26 to be projected from the outer panel 7 and thus causing the mated openings 39b and 26d to be exposed to the outside. Then, with the outside handle 26 kept projected, a bolt 57 is inserted into the mated openings 39b and 26d to achieve an integral connection between the outside handle 26 and the handle lever 39. When the external force applied to the outside handle 26 is removed, the outside handle 26 is pivoted downward due to the force of the spring 55 and thus assumes a concealed rest position as shown in FIG. 17. Under this rest condition, the bolt 57 (more specifically, bolt head) is concealed from the outside. From the above, it will be appreciated that the mounting of the outside handle 26 to the door 1 is achieved from the outside of the door 1.

As may be understood from FIG. 1, upper and lower door hinges (not shown), the door lock module 4 and the panel lift module 3 are mounted to the frame module 5 to constitute a structural base of the door 1.

The frame module 5 comprises a generally U-shaped upper pipe 43 and a generally U-shaped lower pipe 44. These two pipes 43 and 44 are connected through an upper hinge bracket 45 and a door lock bracket 47. A lower hinge bracket 46 is secured to the lower pipe 44 below the upper hinge bracket 45. Suitable beams (no numeral) are further employed for reinforcing the frame module 5.

The upper and lower pipes 43 and 44 are of a square metal pipe. The lower pipe 44 is larger in cross section than the upper pipe 43. If the upper pipe 43 is 16 mm in width and 1.0 mm in thickness, the lower pipe 44 should have a width greater than 25 mm and a thickness greater than 1.2 mm. The upper pipe 43 is secured to an upper portion of the sash 13 to reinforce the same. Preferably, the upper and lower hinge brackets 45 and 46 are constructed of a metal plate of about 2.0 mm in thickness. The above-mentioned upper and lower hinges (not shown) are secured to these hinge brackets 45 and 46. Preferably, the door lock bracket 47 is constructed of a metal plate of about 1.4 to 1.6 mm in thickness. The above-mentioned door lock 27 is secured to the door lock bracket 47.

As is seen from FIG. 1, the inner panel module 6 comprises a plastic inner panel 49, a speaker 50, an arm rest 52 and a door trim 59. The inner panel 49 has around its periphery except an upper part thereof a mounting hem 49a to which the peripheral portion of the outer panel 7 is secured.

It is thus to be noted that, upon assembly of the door 1, the pane lift module 3 and the frame module 5 which are united are interposed between the outer panel 7 and the inner panel module 6 which are united, and the door lock module 4 is mounted to the frame module 5.

When, in the panel lift module 3, the electric motor 20 of the panel regulator 14 is energized, the two geared cables 22 are moved. With this, the carrier plates 19 are moved upward or downward along the guides 11 thereby moving the window pane 10 upward or downward in the door 1.

In the following, assembly of the door 1 will be described with reference to FIGS. 1 and 2.

Prior to assembling the door 1, the pane lift module 3 and the door lock module 4 are subjected to inspection for testing the window pane regulator 14 and the door lock 27.

Then, the pane lift module 3 and the door lock module 4 are mounted to the frame module 5.

Then, as is seen from FIG. 2, by screwing bolts 56 into the embedded nuts 7e, the frame module 5 and the inner panel module 6 are secured to the outer panel 7 of the outer panel module 2.

If the door lock 27 and the inside handle 25 of the door lock module 4 fail to take proper mounting positions relative to the neighboring modules, the inside handle mounting bracket 28 and the door lock mounting bracket 29 are somewhat moved forward, rearward, upward or downward relative to the connecting bracket 30 to permit the door lock 27 and the inside handle 25 to take their proper positions. With this position adjustable connection between the connecting bracket 30 and each mounting bracket 28 or 29, adjustment of connecting wires 58 between the door lock 27 and the inside handle 25 can be made before assembling of the door 1.

In the following, advantages of the above-mentioned first embodiment will be described.

First, since the pane guides 11 are integral with the vertical portions 13a and 13a' of the sash 13, the stability of the guides 11 relative to the sash 13 is excellent. This means that the upward and downward movement of the window pane 10 along the guides 11 is smoothly carried out.

Second, since the window pane 10 is held by the two spaced carrier plates 19, undesired inclination and play of the pane 10 during its movement is suppressed or at least minimized.

Third, because of using the geared cables 22 which are flexible, the pane regulator 14 including the motor 20 has a freedom in positioning. That is, the pane regulator 14 can be located at any space in the door 1 so long as the space can accommodate the regulator 14. This is quite advantageous in making the door compact in size.

Fourth, because the parts of the door 1 constitute the modules 2, 3, 4, 5 and 6 as described hereinabove, the function tests of the window panel regulator 14, the door lock 27 and the like can be carried out prior to assembling the door 1. This means facilitation of assembling the door 1.

Fifth, in the door lock module 4, because of provision of stopper pawls 28b and 30c, the relative positioning between the connecting bracket 30 and the inside handle mounting bracket 28 or the door lock mounting bracket 29 is limited. This means facilitation of adjusting the relative positioning.

Sixth, because the door 1 can be constructed by assembling the modules 2, 3, 4, 5 and 6 side by side, the door 1 can be assembled by an automatic assembling line which uses various robots. In this connection, the door lock module 4 is easily manipulated or carried by the robots because the connecting bracket 30 has such a shape as to be easily gripped by the robots.

Figure 18:
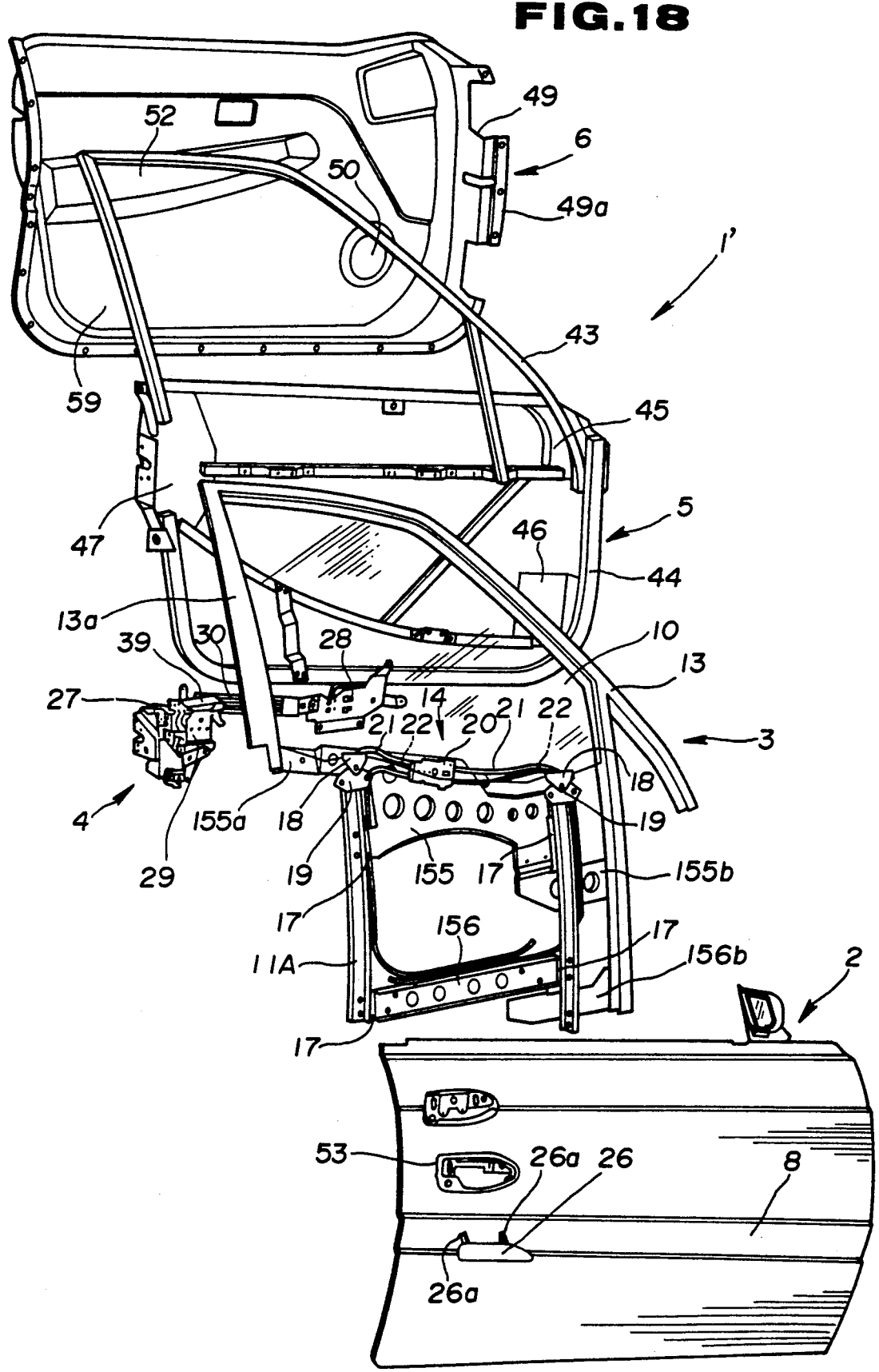
Figure 20:
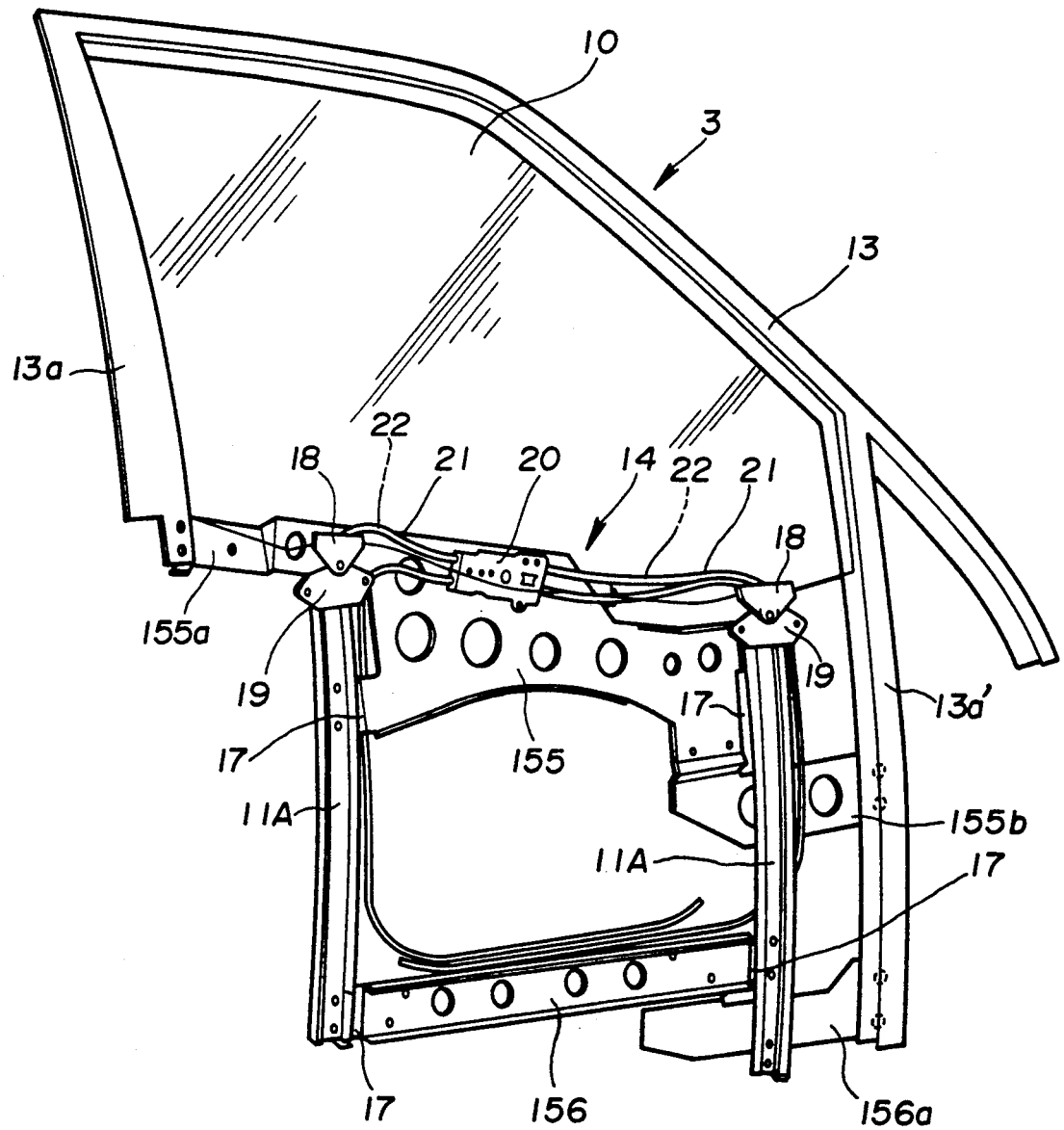

Referring to FIGS. 18 to 20, there is shown an automotive right side door of a second embodiment of the present invention, which is generally designated by numeral 1'.

Since the door 1' of this second embodiment is similar in construction to the door 1 of the first embodiment, only the parts and construction which are different from those of the first embodiment will be described in the following. The parts and construction identical to those of the first embodiment 1 are designated by the same numerals.

As is seen from FIG. 18, the sash 13 of the pane lift module 3 of this embodiment has no portion which corresponds to the lower part of the vertical portion 13a of the sash 13 of the first embodiment.

The pane lift module 3 of the second embodiment employs upper and lower brackets 155 and 156. Each bracket 155 or 155 is formed with a plurality of openings for weight reduction. One end 155a of the upper bracket 155 is bolted to a lower end of the vertical portion 13a of the sash 13 and the other end 155b of the same is bolted to a middle part of the vertical portion 13a'. One end 156b of the lower bracket 156 is bolted to a lower part of the vertical portion 13a'.

As is best understood from FIG. 20, a pair of guide members 11A are connected through position adjusting brackets 17 to the upper and lower brackets 155 and 156, which extend vertically in parallel with each other.

As is seen from FIG. 19, each position adjusting bracket 17 has a generally L-shaped configuration including first and second mounting portions 17a and 17c. The first mounting portion 17a is formed with two parallel slots 17b, and the second mounting portion 17c is formed with two openings 17d. Upon assembly, the first mounting portion 17a is secured via bolts 23 to a mounting bracket 155c or 156c of the bracket 155 or 156, and the second portion 17c is secured via bolts 23 to the guide member 11A. For this securing, the mounting bracket 155c or 156c and the guide member 11A have respectively two openings (no numerals) for receiving the bolts 23 therethrough.

Due to provision of the slots 17b in the position adjusting bracket 17, the relative positioning between the bracket 155 or 156 and the guide member 11A is adjustable.

If the upper and lower brackets 155 and 156 and the two guide members 11A fail to take proper positioning relative to one another, the position adjusting brackets 17 are somewhat loosed for adjusting the relative positioning and then fastened again. With this, smoothed upward and downward movement of the window pane 10 is obtained.

The upper bracket 155 is equipped with a reversible electric motor 20 from which two pairs of flexible tubes 21 extend to the respective guide members 11A. Within each pair of tubes 21, there is slidably installed a flexible geared cable 22. Both ends of each geared cable 22 are connected to corresponding one carrier plate 19. Thus, upon energization of the motor 20, the geared cables 20 are moved in one direction thereby to move the carrier plates 19 and thus the window pane 10 upward or downward along the guide members 11A.

In the second embodiment 1', substantially the same advantages as those of the aforementioned first embodiment 1 are obtained.

Furthermore, due to provision of the position adjusting brackets 17, smoothed movement of the window pane 10 along the guide members 11A is assured.

Referring to FIGS. 21 to 24, there is shown an automotive left side door of a third embodiment of the present invention, which is generally designated by numeral 1".

The door 1" of this embodiment is substantially the same in construction as the door 1' of the second embodiment except for the frame module 61 and the pane lift module 62.

As is seen from FIG. 21, the frame module 61 employed in this third embodiment 1" comprises a front panel 63 and a rear panel 64 which are welded at 65 (see FIG. 22) to constitute a single panel unit by means of a laser welding machine. The single panel unit, that is, the welded panels 63 and 64 are simultaneously pressed by a common press to have a desired configuration. The panels 63 and 64 thus united are formed with a considerable opening 66 for reducing the weight thereof. The front panel 63 is formed at its front end with upper and lower hinge mounting portions 63a and 63b and at its front upper part with a sash mounting portion 63c. The sash mounting portion 63c is so sized as to cover a triangular open part 74 of the sash 70. The rear panel 64 is formed at its rear end with a door lock mounting portion 64a and at its rear upper part with a sash mounting portion 64b. The front panel 63 is constructed of a metal plate of about 2.0 mm in thickness, and the rear panel 64 is constructed of a metal plate of about 1.0 to 1.2 mm in thickness. However, the thickness of the rear panel 64 at the door lock mounting portion 64a is about 1.4 to 1.6 mm.

It is to be noted that the frame module 61 employed in this third embodiment has no means which corresponds to the generally U-shaped upper pipe (43) employed in the afore-mentioned second embodiment (see FIG. 18).

As is seen from FIG. 21, the pane lift module 62 in the third embodiment comprises a window pane 67, a pair of guide members 68a and 68b for guiding upward and downward movements of the window pane 67, a generally U-shaped sash 70 equipped with a pane runner 69, and a regulator 71 for driving the window pane 67. The pane lift module 62 is secured to the frame module 61. As is seen from FIG. 24, a lateral bracket 76 is secured to the sash 70. That is, the bracket 76 has front and rear ends which are welded to the vertical front and rear parts of the sash 70. The lateral bracket 76 has the guide members 68a and 68b secured thereto. Each guide member 68a or 68b has a bracket which is secured to the frame module 61.

As is seen from FIG. 21, the regulator 71 comprises a reversible electric motor 73 which is mounted to the sash 70 below the triangular open part 74. A pair of carrier plates 72a and 72b are secured to spaced lower portions of the window pane 67 and slidably engaged with the guide members 68a and 68b.

Figure 24:
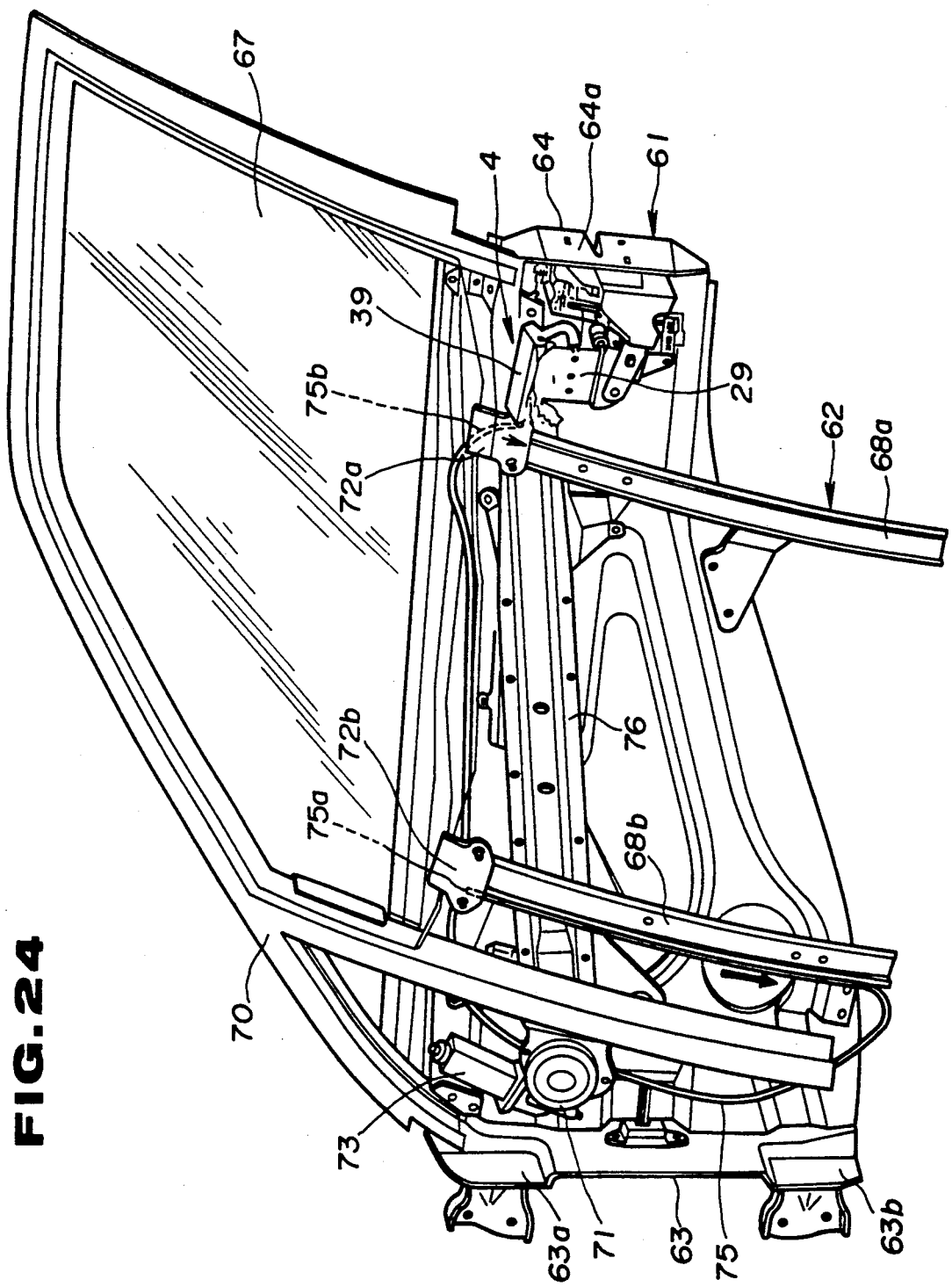

As is well shown in FIG. 24, only one geared cable 75 is used for moving the two carrier plates 72a and 72b. That is, the geared cable 75 has a portion meshed with a gear (not shown) driven by the motor 73. One part of the geared cable 75 extends to a lower part of the guide member 68b and extends upward along the guide member 68b and is secured at its leading end 75a to the carrier plate 72b. The other part of the geared cable 75 extends to an upper part of the other guide member 68a and is secured at its leading end 75b to the other carrier plate 72a. Thus, when, due to energization of the motor 73, the geared cable 75 is moved in the direction of the thick arrow in FIG. 24, the carrier plate 72b is pulled down by the cable 75 and the other carrier plate 72a is pushed down by the cable 75. With this, the window pane 67 is moved down.

Figure 23:
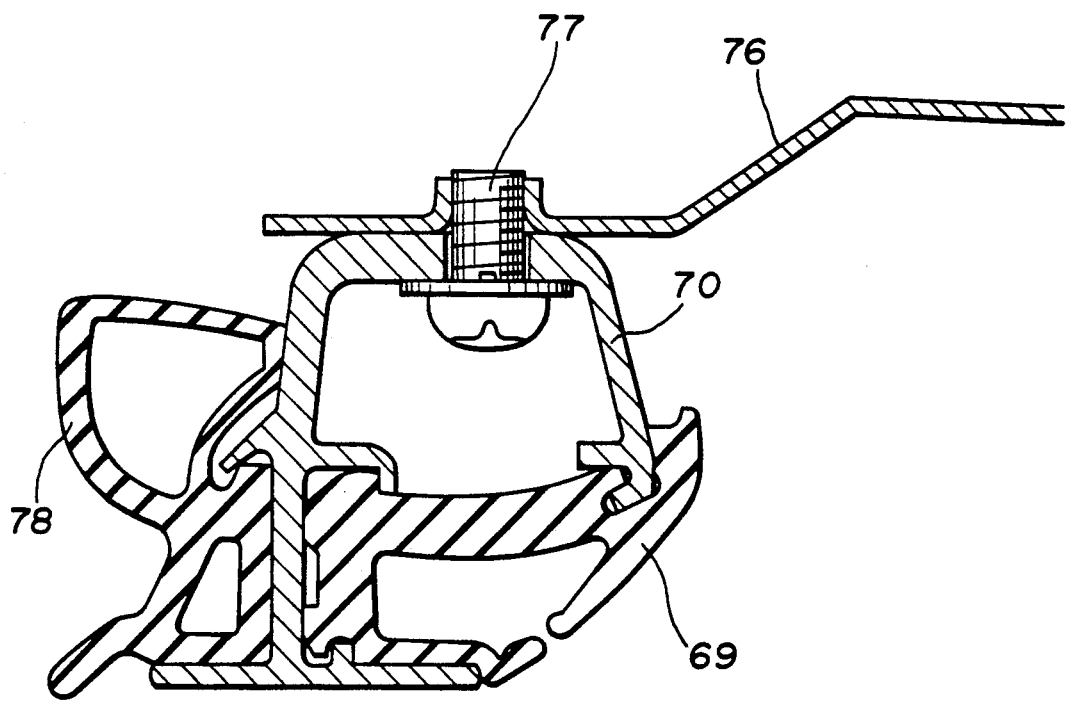

The sash 70 has such a cross section as shown in FIG. 23. The sash 70 is secured to a bracket 76 by means of bolts 77. The bracket 76 is secured to the frame module 61. The sash 70 is equipped with a pane runner 69 and a weather strip 78.

It is to be noted that the bolts 77 are concealed by the pane runner 69. Thus, the bolts 77 can be located at any places so long as the same are concealed by the pane runner 69. More specifically, the sash 70 can be bolted to the sash mounting portion 63c of the frame module 61, the portion 63c being projected upward beyond a waist portion of the door 1". This induces a reinforced structure of the sash 70.

FIG. 24 shows a condition wherein the pane lift module 62, the frame module 61 and the door lock module 4 are assembled.

It is to be noted that between the bracket 76 and the sash 70, there is intimately sandwiched a shim having a given thickness. Thus, by changing the size of the shim, the relative positioning between the bracket 76 and the sash 70 can be changed.

As is seen from FIG. 21, the inner panel module 79 comprises a plastic inner panel 49, speakers 50, an arm rest 52 and a door trim 59. A plurality of switches 81 are mounted to a front portion of the arm rest 52, from which a plurality of wires 83 extend and pass through an opening 84 formed in the plastic inner panel 49. Designated by numeral 82 is a socket which is mounted to the front portion of the arm rest 52.

Electric wires 87 from the door lock 27 on the door lock module 4 extend through a longitudinally extending groove of the connecting bracket 30 and through the inside handle mounting bracket 28. The wires 87 have at their leading ends a plug 88 which is to be detachably connected to the socket 82. Because the wires 87 are received in the groove of the connecting bracket 30, it does not occur that the upward and downward movements of the window panel 67 damages the wires 87.

In the third embodiment 1", substantially the same advantages as those of the aforementioned second embodiment 1 are obtained.

Furthermore, because of use of the frame module 61 which is integrally pressed, the productivity of the door 1" is much improved as compared with the doors 1 and 1' of the first and second embodiments.

What is claimed is:

1. An automotive door comprising:
an outer panel module including an outer panel;
a pane lift module including a sash, a window pane vertically slidably held by said sash, two spaced guide means connected to said sash, each guide means extending vertically, two carrier plates respectively guided by said guide means and carrying thereon said window pane, and an electric drive means for driving said carrier plates along said guide means;
a door lock module including a door lock;
a frame module to which said pane lift module and said door lock module are secured to constitute an interior unit; and
an inner panel module including an inner panel, said inner panel module being secured to said outer panel module having said interior unit disposed therebetween.

2. An automotive door as claimed in claim 1, in which said inner panel of said inner panel module has around its periphery except an upper part thereof a mounting hem to which a peripheral portion of the outer panel of said outer panel module is secured.

3. An automotive door as claimed in claim 2, in which said electric drive means comprises:
a reversible electric motor; and
a pair of geared cables driven by said motor, each geared cable having both ends connected to the corresponding carrier plate.

4. An automotive door as claimed in claim 2, in which said electric drive means comprises:
a reversible electric motor; and
a single geared cable having a middle portion driven by said motor, said geared cable having both ends respectively connected to the two carrier places.

5. An automotive door as claimed in claim 2, in which said pane lift module further includes two holders which are pivotally connected to said carrier plates and hold said window pane.

6. An automotive door as claimed in claim 5, in which said door lock module further comprises:
an inside handle;
an inside handle mounting bracket on which said inside handle is operatively mounted;
a door lock mounting bracket on which said door lock is operatively mounted;
a connecting bracket having first and second ends;
a first position adjusting means through which said first end of said connecting bracket is connected to said inside handle mounting bracket; and
a second position adjusting means through which said second end of said connecting bracket is connected to said door lock mounting bracket.

7. An automotive door as claimed in claim 6, in which each of said first and second position adjusting means comprises:
pivot means for permitting a pivotal movement of one member relative to the other member;
stopper means for restricting the pivotal movement of the one member relative to the other member; and
fastening means for tightly fastening the one member to the other member.

8. An automotive door as claimed in claim 7, in which the pivot and fastening means of said first position adjusting means comprises:
means defining a circular opening in the one member;
a nut secured to the one member and mated with said circular opening;
an annular bush;
means defining an elongate slot in the other member;
a washer; and
a bolt passed through said washer, elongate slot, said annular bush, said circular opening and screwed into said nut.

9. An automotive door as claimed in claim 8, in which said stopper means comprises:
a stopper pawl integral with the one member; and
means defining in the other member a rectangular opening in which said stopper pawl is loosely put.

10. An automotive door as claimed in claim 7, in which the pivot and fastening means of said second position adjusting means comprises:
a washer;
means defining a first circular opening in the one member;
an annular bush;
means defining a second circular opening in the other member;

a nut secured to the other member and mated with said second circular opening; and a bolt passed through said washer, said first circular opening, said annular bush and said second circular opening and screwed into said nut.

11. An automotive door as claimed in claim 10, in which said stopper means comprises:

a stopper pawl integral with the other member; and means defining in the one member an arcuate opening in which said stopper pawl is loosely put, said arcuate opening being concentric with said first circular opening.

12. An automotive door as claimed in claim 2, in which the securing of said inner and outer panels at their peripheral portions is achieved by a plurality of bolts.

13. An automotive door as claimed in claim 12, in which said peripheral portion of said outer panel has a plurality of nuts embedded therein for fastening said bolts.

14. An automotive door as claimed in claim 13, in which said outer and inner panels are constructed of plastics.

15. An automotive door as claimed in claim 14, in which said peripheral portion of said outer panel is thicker than the remaining portion of the same.

16. An automotive door as claimed in claim 15, in which a part of said frame module is sandwiched between the peripheral portions of said outer and inner panels and secured thereto by said bolts and nuts.

17. An automotive door as claimed in claim 16, in which said frame module comprises:

a generally U-shaped upper pipe;

a generally U-shaped lower pipe;

first and second brackets through which said upper and lower pipes are connected to constitute an enclosed frame structure.

18. An automotive door as claimed in claim 17, in which said lower pipe has a larger cross section than said upper pipe.

19. An automotive door as claimed in claim 17, in which said frame module comprises front and rear panels which are welded to constitute a single panel unit and pressed to have a desired configuration.

20. An automotive door as claimed in claim 19, in which said single panel unit is formed with a large opening for reducing the weight thereof.

21. An automotive door as claimed in claim 20, in which said single panel unit is formed with a sash mounting portion to which a part of said sash is bolted.

22. An automotive door as claimed in claim 12, in which said guides means are parallel guide members held by said sash.

23. An automotive door as claimed in claim 22, in which each of said guide members is integral with a vertical portion of said sash.

24. An automotive door as claimed in claim 22, in which each of said guide members is connected to said sash through separate upper and lower brackets, each bracket being formed with a plurality of openings for weight reduction.

25. An automotive door as claimed in claim 24, in which the connection of each guide member to each of said upper and lower brackets is made through a position adjusting means, so that relative positioning between said guide member and said bracket is adjustable.

26. An automotive door as claimed in claim 25, in which said position adjusting means comprises:

a generally L-shaped member which includes a first mounting portion formed with two parallel slots, and a second mounting portion formed with two openings;

a first mounting portion defined by each of said upper and lower brackets, said first mounting portion having two openings which are to be mated with said parallel slots of of the first mounting portion of said bracket;

a second mounting portion defined by each of said guide member, said second mounting portion being formed with two openings which are to be mated with the openings of the second mounting portion of said bracket; and a plurality of bolts passed through the mated openings for securing the guide member and the bracket having the bracket tightly interposed therebetween.

27. An automotive door as claimed in claim 22, in which each of said guide member is connected to said sash through a lateral bracket, said lateral bracket having one end secured to one vertical portion of said sash and the other end secured to the other vertical portion of said sash.

* * * * *